United States Patent
Cavanaugh et al.

(10) Patent No.: US 11,852,152 B2
(45) Date of Patent: Dec. 26, 2023

(54) PIN VENT ASSEMBLY

(71) Applicant: The Gorman-Rupp Company, Mansfield, OH (US)

(72) Inventors: Craig Louis Cavanaugh, Ossian, IN (US); Jacob John Berry, Uniondale, IN (US); David Michael Leckman, Fort Wayne, IN (US); Miles Anthony Ebert, Auburn, IN (US)

(73) Assignee: The Gorman-Rupp Company, Mansfield, OH (US)

( * ) Notice: Subject to any disclaimer, the term of this patent is extended or adjusted under 35 U.S.C. 154(b) by 495 days.

(21) Appl. No.: 17/062,046

(22) Filed: Oct. 2, 2020

(65) Prior Publication Data

US 2021/0102544 A1    Apr. 8, 2021

Related U.S. Application Data

(60) Provisional application No. 62/949,713, filed on Dec. 18, 2019, provisional application No. 62/911,430, filed on Oct. 7, 2019.

(51) Int. Cl.
*H02K 5/136* (2006.01)
*F04D 25/08* (2006.01)
(Continued)

(52) U.S. Cl.
CPC .............. *F04D 25/08* (2013.01); *F04C 14/28* (2013.01); *F04D 13/06* (2013.01); *H02K 5/136* (2013.01); *H02K 15/14* (2013.01); *H02K 2205/09* (2013.01)

(58) Field of Classification Search
CPC .... H02K 5/136; H02K 2205/09; F04C 14/28; F04C 2210/203; F04C 2220/40; F04C 2240/30; F04B 53/16
See application file for complete search history.

(56) References Cited

U.S. PATENT DOCUMENTS

| 571,283 A | 11/1896 | Pence |
| 1,001,491 A | 8/1911 | Wilkin et al. |
| (Continued) | | |

FOREIGN PATENT DOCUMENTS

| AR | 78965 A1 | 12/2011 |
| AU | 2010202250 B2 | 2/2015 |
| (Continued) | | |

OTHER PUBLICATIONS

Hobbywing, Ezrun, Max 8 Brushless Electronic Speed Controller, User Manual, Jan. 6, 2016.
(Continued)

*Primary Examiner* — Ramon M Barrera

(57) ABSTRACT

A fluid transfer pump assembly is provided that includes an electronic device enclosure, a bore, and a vent pin. The electronic device enclosure includes a wall separating an interior from an exterior of the explosion-proof fluid transfer pump assembly. The electronic device enclosure includes a bore extending through the wall of the electronic device enclosure from the interior of the electronic device enclosure to the exterior of the explosion-proof fluid transfer pump assembly. The bore is formed by at least one peripheral surface extending from the interior of the electronic device enclosure to the exterior of the explosion-proof fluid transfer pump assembly. The vent pin extends into the bore. The vent pin fills space within the bore and engages the at least one peripheral surface except that at least one portion of a pin surface of the vent pin is spaced apart from at least one portion of the at least one peripheral surface of the bore.

20 Claims, 15 Drawing Sheets

(51) Int. Cl.
*F04D 13/06* (2006.01)
*F04C 14/28* (2006.01)
*H02K 15/14* (2006.01)

(56) References Cited

U.S. PATENT DOCUMENTS

| | | | |
|---|---|---|---|
| 3,700,359 | A | 10/1972 | Vanderjagt |
| 4,013,383 | A | 3/1977 | Rule |
| 4,092,905 | A | 6/1978 | Wood |
| 4,931,678 | A | 6/1990 | Lutz |
| 5,450,881 | A | 9/1995 | Patterson |
| 5,810,568 | A | 9/1998 | Whitefield et al. |
| 5,930,852 | A | 8/1999 | Gravatt et al. |
| 6,091,174 | A | 7/2000 | Genster |
| 6,663,362 | B1 | 12/2003 | Lentz et al. |
| 7,036,892 | B2 | 5/2006 | Suzuki et al. |
| 7,097,433 | B2 | 8/2006 | Struthers et al. |
| 8,485,040 | B2 | 7/2013 | Petersen |
| 8,535,014 | B2 | 9/2013 | Burch, Jr. et al. |
| 8,834,153 | B2 | 9/2014 | Helmsen et al. |
| 8,960,320 | B2 | 2/2015 | Moyer |
| 9,337,707 | B2 | 5/2016 | Dixon |
| 9,825,561 | B2 | 11/2017 | Dixon |
| 10,333,119 | B2 | 6/2019 | Partington et al. |
| 10,590,939 | B2 | 3/2020 | Wenger et al. |
| 2004/0037719 | A1 | 2/2004 | Sunaga et al. |
| 2009/0317259 | A1* | 12/2009 | Burch, Jr. ............... H02K 11/21 417/1 |
| 2014/0210321 | A1 | 7/2014 | Dixon et al. |
| 2016/0084145 | A1 | 3/2016 | Fulton |
| 2016/0305653 | A1 | 10/2016 | Fields et al. |
| 2019/0323512 | A1 | 10/2019 | Wenger et al. |

FOREIGN PATENT DOCUMENTS

| | | |
|---|---|---|
| BR | 112013023467 A2 | 12/2016 |
| BR | 112012011295 A2 | 10/2017 |
| BR | PI1001491 B1 | 6/2019 |
| CA | 2706196 C | 4/2016 |
| CA | 2780521 C | 9/2017 |
| CA | 2823785 C | 2/2019 |
| CN | 202748188 U | 2/2013 |
| CN | 203395565 U | 1/2014 |
| CN | 103244723 B | 1/2015 |
| CN | 102655913 B | 8/2015 |
| CN | 103348505 B | 8/2015 |
| CN | 102680163 B | 8/2016 |
| CN | 201610430749.9 A | 8/2016 |
| CN | 101920080 B | 9/2017 |
| DK | 2260906 T3 | 7/2013 |
| EP | 2498877 A1 | 9/2012 |
| EP | 2260906 B1 | 5/2013 |
| EP | 2101061 B1 | 9/2013 |
| EP | 2686642 A2 | 1/2014 |
| EP | 2453502 B1 | 5/2014 |
| EP | 3081266 A2 | 10/2016 |
| ES | 2411685 T3 | 7/2013 |
| GB | 2303972 A | 3/1997 |
| GB | 2517457 B | 6/2016 |
| IL | 206246 | 12/2010 |
| JP | 57021968 B2 | 3/2015 |
| JP | 5775090 B2 | 9/2015 |
| JP | 5973474 B2 | 8/2016 |
| JP | 2019004608 A | 1/2019 |
| KR | 1686245 B1 | 12/2016 |
| MX | 2012005547 A | 8/2012 |
| MX | 2013008475 A | 11/2013 |
| RU | 2559157 C2 | 8/2015 |
| RU | 2562498 C2 | 9/2015 |
| TW | I571283 B | 2/2017 |
| WO | 2014116576 A1 | 7/2014 |
| ZA | 201004081 A | 3/2011 |

OTHER PUBLICATIONS

Associated Electrics, Inc., XP Digital, XPSC450—BL Brushless Electronic Speed Control Manual.
Partial European Search Report; 19169961.0;-1004; dated Jul. 24, 2019.
International Search Report; PCT/US 20/54232 Filing Dated Oct. 5, 2020; dated Jan. 27, 2021.

* cited by examiner

PIN VENT ASSEMBLY

RELATED APPLICATIONS

The present application is related to and claims priority to U.S. Provisional Patent Application Ser. No. 62/911,430, filed on Oct. 7, 2020, entitled "Pin Vent Assembly" and to U.S. Provisional Patent Application Ser. No. 62/949,713, filed on Dec. 18, 2019, entitled "Pin Vent Assembly-2" the subject matter disclosed in these Provisional applications are hereby expressly incorporated into the present Application.

TECHNICAL FIELD

The present disclosure relates to fluid transfer pump assemblies, and particularly to such a pump assembly that has air ingress/egress capabilities in the pump assembly's housing.

Fluid transfer pumps move fluid from one location to another. One example includes a pump that moves hazardous fluid, such as gasoline, from a storage tank to a vehicle. The pump may employ vanes, diaphragms, or other like structures that are rotated or oscillated inside the pump via some motive force such as an electric motor. The vanes are located in a pump enclosure that is in fluid communication with inlet and outlet manifolds. The inlet manifold may also be in fluid communication with the gasoline in the storage tank while the outlet manifold may also be attached to a hose or other structure configured to deliver the gasoline to another location. As the motor moves the vanes, a vacuum is created in the pump enclosure to cause the gasoline already present in the tank to be drawn up through the inlet manifold. The vanes then rapidly push the gasoline out through the outlet manifold and the hose, to be delivered to the other location. A nozzle or other type of valve structure may be attached at the other end of the hose to selectively dispense the pumped gasoline.

An electric motor is a suitable means for moving the vanes inside the pump. This is because the motor is able to generate enough velocity to effectively draw up and dispense the fluid at a sufficient rate.

Fluids like gasoline, however, may pose a risk when utilizing electric motors because such motors have a propensity to produce heat, sparks, arcs, and even flames during abnormal conditions. Placing such motors in potentially flammable environments can, therefore, be hazardous. That is why electric motors are housed in explosion-proof housing enclosures. These enclosures prevent any internal explosion from propagating to a surrounding explosive atmosphere.

One manner of mitigating explosions that occur inside the motor enclosure from propagating to outside the motor enclosure is to provide flame paths, such as at the joint between the motor enclosure and end bell. The flame path may be an extended seam located at the motor enclosure joint where the motor enclosure and end bell couple to each other. For example, the end bell may include an extended flange sized to fit against an elongated collar on the motor enclosure. The result is a pathway located between the spaced-apart interior and exterior seams of the enclosure and end bell. The space between the extended flange and collar provides a pathway that will extinguish any flames generated by an explosion inside the enclosure. This prevents the explosion from reaching the external explosive environment, thereby eliminating risk of igniting any flammable concentration of vapors outside of the enclosure.

Further disclosure of such explosion-proof pumps are found in U.S. patent application Ser. No. 15/958,217, entitled "Fluid Pump Assembly," filed on Apr. 20, 2018, the disclosure of which is expressly incorporated herein by reference.

An issue that may develop with explosion-proof pumps is that they can be susceptible to moisture ingress. When such a pump is moving fluid, the internal mechanisms within the pump housing—a motor and a controller (or other electronics), for example—can generate heat. Also, direct exposure to sunlight may generate heat as well. This, in turn, will increase the temperature of the pump structure. Because such pumps are adept at moving flammable fluid such as gasoline, they are often exposed to a variety of outside environments. One of those environments is rain. When a warm pump has been operating for some time, and does so in the rain, the rainwater has a tendency to cool the pump. By reducing the temperature of the warm pump, a pressure differential is created between the interior of the pump housing (where the motor and motor controller are contained) and the outside environment. In this case, the pressure inside the pump housing becomes lower than the pressure of the outside environment. This creates a vacuum effect which causes moisture from the rainwater to be drawn into the pump housing as the pressure attempts to rebalance.

Despite explosion-proof pumps being tightly sealed, they have these flame-paths located between the interior and exterior of the housing. Under these circumstances, the pressure differential is able to develop. Because of this, moisture from the outside is drawn up to the inside of the pump housing (like sucking on a straw) as the pump equalizes pressure. The net result is moisture becoming trapped within the pump housing in the vicinity of the pump motor and other electronics which may damage these components or lead to premature corrosion.

That said, explosion-proof pumps pose a unique challenge because they must remain sealed except for these flame paths for assembly and manufacturing purposes to mitigate any potential for explosive pressure to build up inside the pump. Typically, these flame paths are thin longitudinally extending seams that may be created between adjoining components. The seam's dimensional limits such as gap and length have established limits as defined by certifying entities. Effective flame paths are tested and certified by a certifying entity such as Underwriters Laboratories (UL) or Atex. A flame path is a controlled interface between two or more components that allows gasses to exit an enclosure and cool during passage to temperatures that are unable to trigger the explosive atmosphere outside the enclosure.

An illustrative embodiment of the present disclosure provides an explosion-proof fluid transfer pump assembly that includes a motor enclosure, a bore, and a vent pin. The motor enclosure is located adjacent a pump enclosure. The motor enclosure includes a wall separating an interior that receives a motor configured to drive a pump located in the pump enclosure from an exterior of the explosion-proof fluid transfer pump assembly. The motor enclosure includes a bore extending through the wall of the motor enclosure from the interior of the motor enclosure to the exterior of the explosion-proof fluid transfer pump assembly. The bore is formed by at least one peripheral surface extending from the interior of the motor enclosure to the exterior of the explosion-proof fluid transfer pump assembly. The vent pin extends through the bore and fills space within the bore. The vent pin engages the at least one peripheral surface except that at least one portion of a pin surface of the vent pin is spaced apart from at least one portion of the at least one peripheral surface of the bore to form at least one flame path between the at least one portion of the pin surface of the vent pin and the at least one portion of the at least one peripheral surface of the bore from the interior of the motor enclosure to the exterior of the explosion-proof fluid transfer pump assembly to equalize pressure between the interior of the motor enclosure to the exterior of the explosion-proof fluid transfer pump assembly.

In the above and other illustrative embodiments, the explosion-proof fluid transfer pump assembly may further comprise: the vent pin being friction fit or slip fit with the bore; the at least one peripheral surface of the bore has a circular cross-section and wherein the at least one portion of the pin surface being planar to form the at least one flame path between the at least one portion of the pin surface of the vent pin and the at least one portion of the at least one peripheral surface of the bore; the at least one portion of the pin surface being a plurality of portions of the pin surface, wherein each of the plurality of portions of the pin surface being planar to form a flame path; the at least one portion of the pin surface being a scalloped channel to form the at least one flame path between the at least one portion of the pin surface of the vent pin and the at least one portion of the at least one peripheral surface of the bore; the at least one portion of the pin surface being a plurality of portions of the pin surface, wherein each of the plurality of portions of the pin surface being a scalloped channel to form a flame path; the vent pin has a circular cross-section, wherein the at least one portion of the pin surface being at least one spiraled channel that extends from a first end of the vent pin to a second end of the vent pin to form the flame path; the at least one spiraled channel being a plurality of spiraled channels that extend from the first end of the vent pin to the second end of the vent pin, wherein each of the plurality of spiraled channels forms a flame path; the at least one peripheral surface of the bore having a circular cross-section and the vent pin having a non-circular cross-section; the non-circular cross-section of the vent pin being triangularly-shaped; the at least one peripheral surface of the bore having a polygonal cross-section and the vent pin having a corresponding polygonal cross-section, wherein the at least one portion of the vent pin surface is spaced apart from the peripheral surface of the bore to form the flame path; the at least one portion of the pin surface of the vent pin being a plurality of portions of the pin surface of the vent pin, wherein each of the plurality of portions of the pin surface of the vent pin are spaced apart from the peripheral surface of the bore to form a flame path; the motor enclosure being composed of at least first and second components wherein the at least one peripheral surface of the bore is composed of at least both the first component of the motor enclosure and the second component of the motor enclosure; the at least one peripheral surface of the bore is scored to form the flame path between the at least one portion of the pin surface of the vent pin and the at least one portion of the at least one peripheral surface of the bore; and the at least one portion of the pin surface of the vent pin is scored to form the flame path between the at least one portion of the pin surface of the vent pin and the at least one portion of the at least one peripheral surface of the bore.

Another illustrative embodiment of the present disclosure provides an explosion-proof fluid transfer pump assembly that comprises an electronic device enclosure, a bore, and a vent pin. The electronic device enclosure includes a wall separating an interior from an exterior of the explosion-proof fluid transfer pump assembly. The electronic device enclosure includes a bore extending through the wall of the electronic device enclosure from the interior of the electronic device enclosure to the exterior of the explosion-proof fluid transfer pump assembly. The bore is formed by at least one peripheral surface extending from the interior of the electronic device enclosure to the exterior of the explosion-proof fluid transfer pump assembly. The vent pin extends into the bore. The vent pin fills space within the bore and engages the at least one peripheral surface except that at least one portion of a pin surface of the vent pin is spaced apart from at least one portion of the at least one peripheral surface of the bore to form at least one flame path between the at least one portion of the pin surface of the vent pin and the at least one portion of the at least one peripheral surface of the bore from the interior of the electronic device enclosure to the exterior of the explosion-proof fluid transfer pump assembly to equalize pressure between the interior of the electronic device enclosure to the exterior of the explosion-proof fluid transfer pump assembly.

In the above and other illustrative embodiments, the explosion-proof fluid transfer pump assembly may further comprise: the electronic device is selected from the group consisting of at least one of a motor, circuit board, processor, transformer, integrated circuit, communication device, thermal interface, sensor, rectifier, inductor, capacitor, electro-mechanical switches, wiring, connectors, current and temperature limiting devices, pressure sensors, piezo transducers, antennas, EMI filters, and the like; the at least one peripheral surface of the bore has a cross-section selected from the group consisting of circular and polygonal, and the at least one portion of the pin surface vent pin is selected from the group consisting of at least one of a planar, scalloped, spiraled channel, scored, circularly cross-sectioned, non-circularly cross-sectioned, and triangularly-shape cross-sectioned, that extends from a first end of the vent pin to a second end of the vent pin to form the at least one flame path between the at least one portion of the pin surface of the vent pin and the at least one portion of the at least one peripheral surface of the bore.

Another illustrative embodiment of the present disclosure provides a fluid transfer pump assembly that comprises an electronic device enclosure, a bore, and a vent pin. The electronic device enclosure includes a wall separating an interior from an exterior of the fluid transfer pump assembly. The electronic device enclosure includes a bore extending through the wall of the electronic device enclosure from the interior of the electronic device enclosure to the exterior of the fluid transfer pump assembly. The bore is formed by at least one peripheral surface extending from the interior of the electronic device enclosure to the exterior of the fluid transfer pump assembly. The vent pin extends through the bore and fills space within the bore. The vent pin also engages the at least one peripheral surface except that at least one portion of a pin surface of the vent pin is spaced apart from at least one portion of the at least one peripheral surface of the bore to form at least one passage between the at least one portion of the pin surface of the vent pin and the at least one portion of the at least one peripheral surface of the bore from the interior of the electronic device enclosure to the exterior of the fluid transfer pump assembly to equalize pressure between the interior of the electronic device enclosure to the exterior of the fluid transfer pump assembly.

Another illustrative embodiment of the present disclosure provides an electronic device assembly. The electronic device assembly comprises: an electronic device enclosure; wherein the electronic device enclosure includes a wall separating an interior from an exterior of the electronic device assembly; wherein the electronic device enclosure includes a bore extending through the wall of the electronic device enclosure from the interior of the electronic device enclosure to the exterior of the electronic device assembly; wherein the bore is formed by at least one peripheral surface extending from the interior of the electronic device enclosure to the exterior of the electronic device assembly; a vent pin that extends through the bore; wherein the vent pin fills space within the bore and engages the at least one peripheral surface except that at least one portion of a pin surface of the vent pin is spaced apart from at least one portion of the at least one peripheral surface of the bore to form at least one passage between the at least one portion of the pin surface of the vent pin and the at least one portion of the at least one peripheral surface of the bore from the interior of the electronic device enclosure to the exterior of the electronic device assembly to equalize pressure between the interior of the electronic device enclosure to the exterior of the electronic device assembly.

In the above and other illustrative embodiments, the electronic device assembly is a flow meter, flow computer, or flow transmitter.

Additional features and advantages of the fluid transfer pump assembly will become apparent to those skilled in the art upon consideration of the following detailed descriptions of carrying out the fluid transfer pump assembly as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
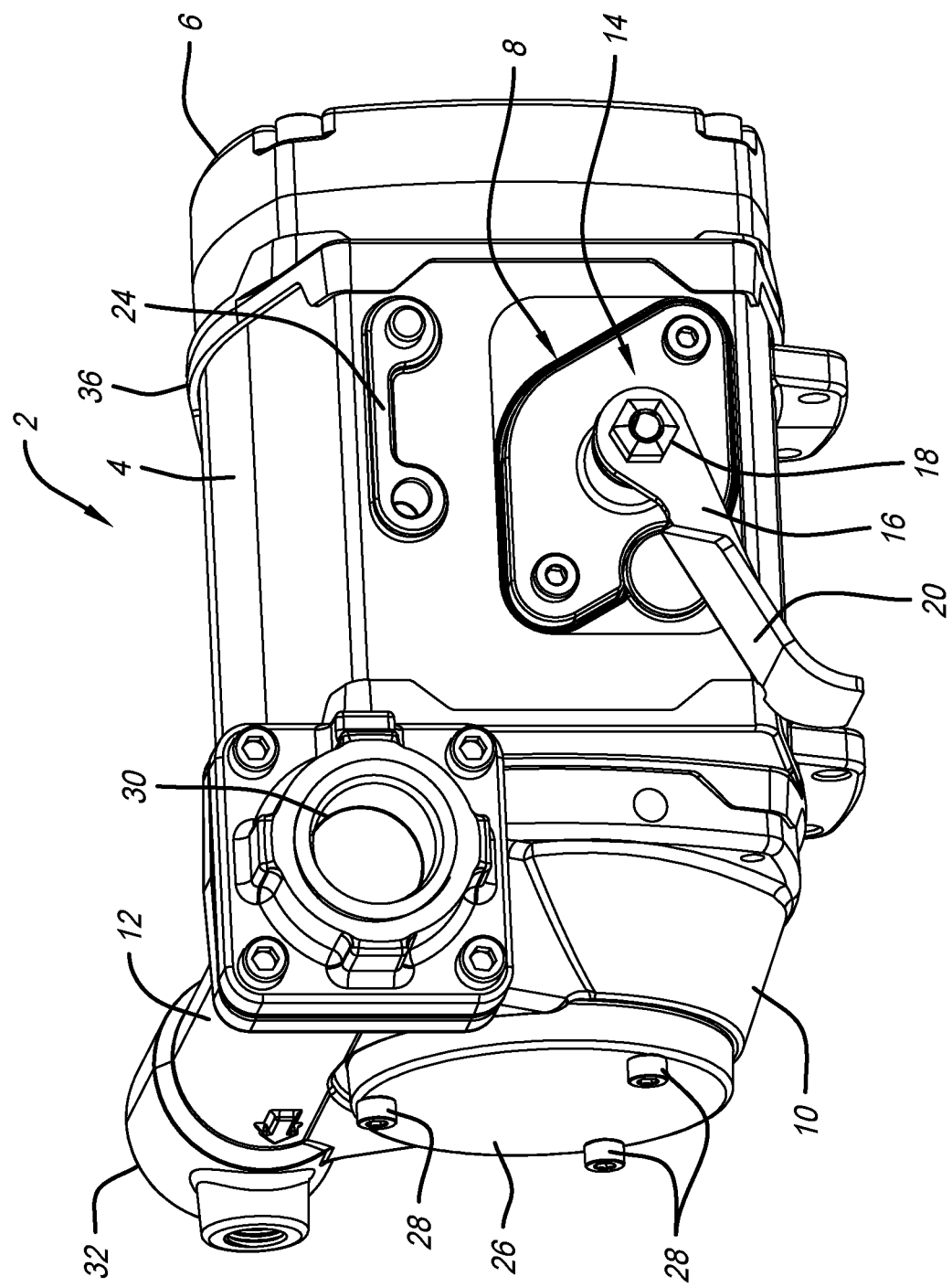
FIG. 1 is a front perspective view of an illustrative fluid transfer pump assembly.

Corresponding reference characters indicate corresponding parts throughout the several views. The exemplification set out herein illustrates embodiments of the fluid transfer pump assembly, and such exemplification is not to be construed as limiting the scope of the fluid transfer pump assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a pump, such as an explosion-proof pump that, among other features, includes a bore or opening disposed through the housing enclosure of the pump from the exterior to the interior. This allows air communication from the outside environment and into the electronics and/or motor cavity within the enclosure. In addition, a pin, dowel, rod or other longitudinally-extending structure is fitted within the bore. The pin has a slightly different geometry than the bore so that at least one (or a plurality of) pathway(s) is(are) formed between the interior and exterior of the enclosure. In this way, the cross-section of the pathway or pathways may be precisely controlled and measured to determine whether they meet the standards for flame path certification. Plugging the bore or opening with a pin or other like longitudinally extending structure, having a slightly different cross-sectional profile than the bore or opening, creates flame paths that can be precisely measured, while at the same time providing air exchange between the interior and exterior of the enclosure. This makes any pressure gradient between the interior and exterior of the enclosure more difficult to generate. As such, water or other external fluid will not be as likely to be drawn into the enclosure.

In another illustrative embodiment, the pin vent assembly may also be employed on explosion proof junction boxes, etc., that are not a pump component. An example is the Cabinet junction box that contains a safety barrier or a meter electronics cavity.

A front perspective view of illustrative fluid transfer pump assembly 2 is shown in FIG. 1. Fluid transfer pump 2 includes a motor enclosure 4, rear end bell 6, switch assembly 8, pump enclosure 10, and manifolds 12. Motor enclosure 4 is part of an overall explosion-proof enclosure along with end bell 6 and pump enclosure 10. This prevents sparks, arcs, and flames from exiting between motor enclosure 4, rear end bell 6, and pump enclosure 10. Switch assembly 8 is positioned on the exterior of motor enclosure 4 as shown. In the illustrated embodiment, switch assembly 8 is shown having a switch shaft assembly 14 attached to switch lever arm 16 via fastener 18. Illustratively, a switch lever handle 20 attached to switch lever arm 16 assists in operating switch assembly 8. Also shown is a nozzle hanger mount 24. It will be appreciated by the skilled artisan that fluid transfer pump 2 may be configured to pump gasoline or other like hazardous materials in a similar manner to conventional gas station pumps. Particularly, a gas dispensing nozzle (not shown) may be employed with the fluid transfer pump 2 and operate in a similar fashion as their gas station fuel pump nozzle counterpart.

Also shown in this view is pump enclosure 10 located adjacent motor enclosure 4 and capped with a rotor cover 26 via fasteners 28. In this illustrative embodiment, pump enclosure 10 encloses a rotor and vanes that are rotated by an electric motor located in motor enclosure 4. The rotating vanes draw up and expel fluid from inlet manifold portion 30 and out through outlet manifold portion 32. It is appreciated that other motive structures to move fluid may be used in place of rotating vanes. Aspects of the disclosure herein are not dependent on the motive means. Also shown in FIG. 1 are aesthetic joint covers 34 and 36. These covers illustratively shroud the explosion-proof joints that exist between motor enclosure 4 and rear end bell 6, as well as motor enclosure 4 and pump enclosure 10.

Figure 2A:
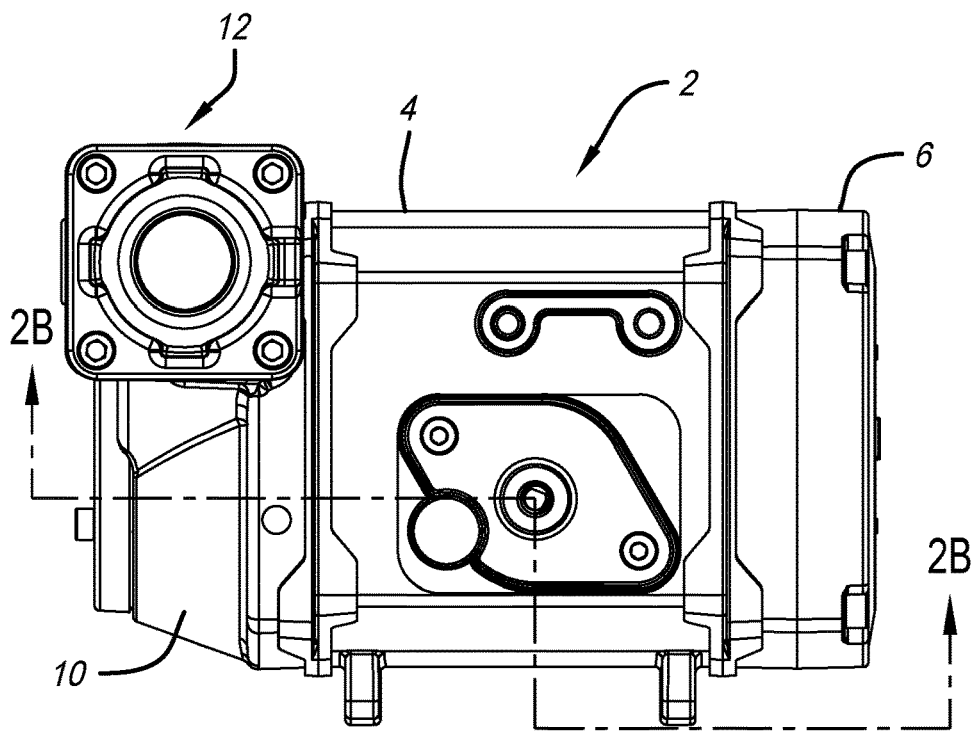
FIGS. 2A, 2B, and 2C are side, side perspective, cutaway, and detail cutaway views of the fluid transfer pump assembly.
Figure 2B:
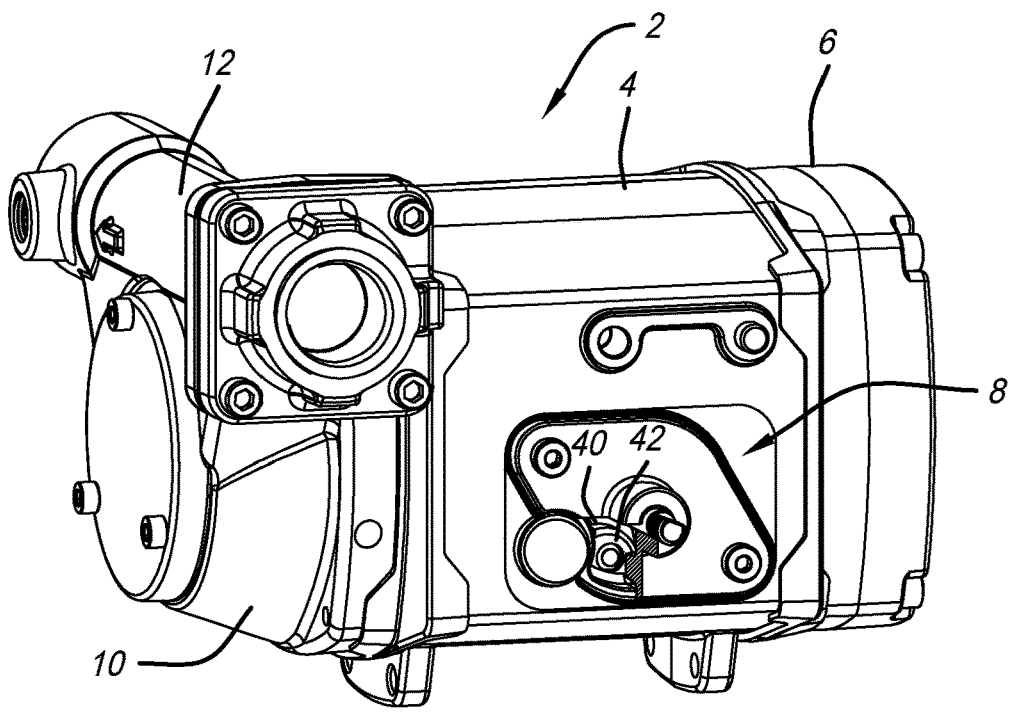
Figure 2C:
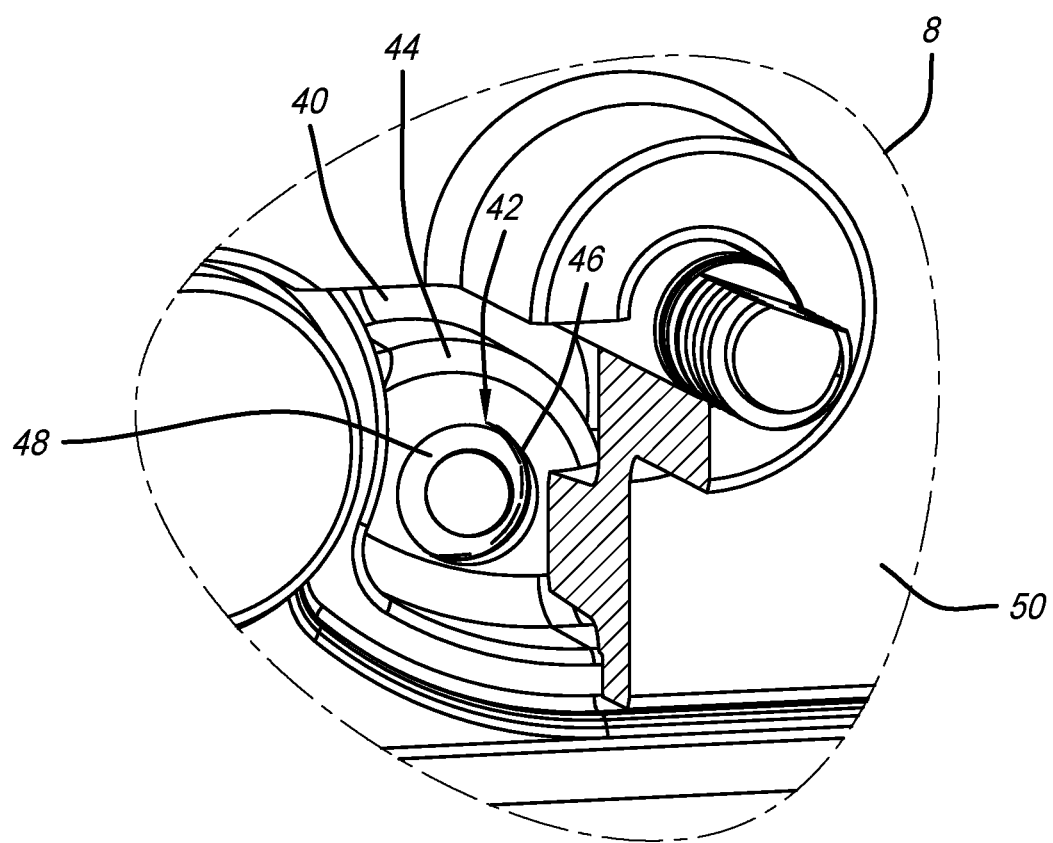

Side, side perspective cutaway, and detail cutaway views of fluid transfer pump assembly 2 are shown in FIGS. 2A, 2B, and 2C, respectively. The views in FIGS. 2A and 2B show motor enclosure 4, rear end bell 6, pump enclosure 10, manifolds 12, and switch assembly 8. As shown in FIGS. 2B and 2C, underneath switch assembly 8 reveals cavity 40 with pin vent assembly 42. As disclosed further herein, pin vent assembly 42 allows air pressure to equalize between the interior and exterior of motor enclosure 4 (as well as in addition or alternative to the other enclosure structures of pump assembly 2), while also operating as a flame path.

As further depicted in FIG. 2C, within cavity 40, is raised ridge 44 within which pin vent assembly 42 is disposed. Pin vent assembly 42 includes a bore 46 disposed through raised ridge 44 and pin 48 disposed in bore 46 as illustratively shown. As further discussed herein, having pin vent assembly 42 disposed through raised ridge 44 allows a longitudinally extending pathway between the interior of, in this case, motor enclosure 4, and the outside environment. That additional longitudinal length allows for the creation of the flame path to exist at the peripheries of bore 46 and pin 48.

It is further appreciated in this view how pin vent assembly 42 is intended to be shrouded by switch assembly 8. This illustratively provides an additional layer of protection to pin vent assembly 42 from outside rain and the like. By having a cover panel 50 shrouding cavity 40 where pin vent assembly 42 is located, rain or other liquid that incidentally lands on fluid pump assembly 2 will not drain or seep into pin vent assembly 42. In an embodiment, cover panel 50 and the periphery of cavity 40 do not create an airtight seal so that air can still pass between the exterior of fluid pump assembly 2, cavity 40, and the interior of motor enclosure 4.

Figure 3:
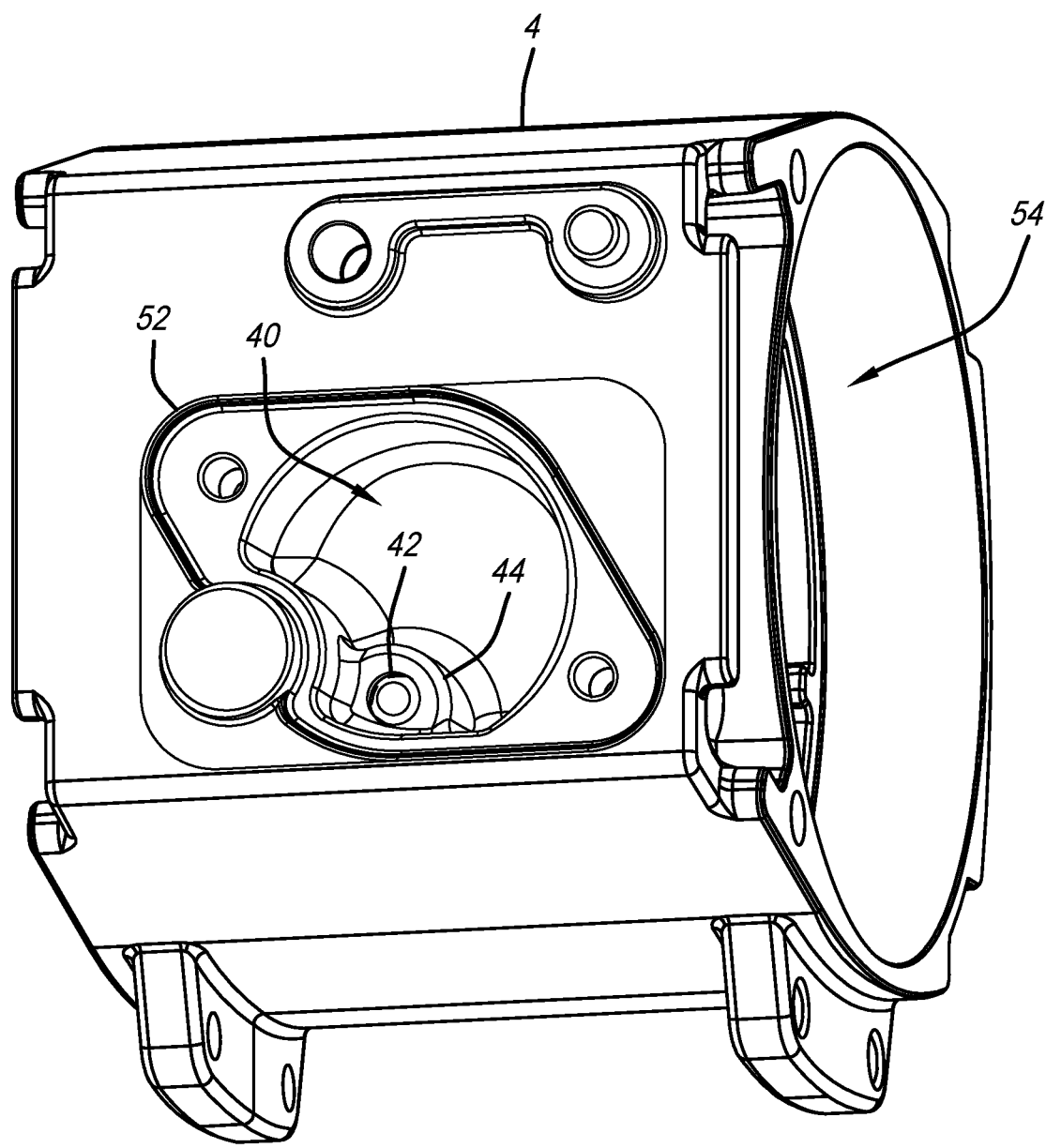
FIG. 3 is a perspective view of a motor enclosure.

A perspective view of motor enclosure 4 is shown in FIG. 3. This view further depicts cavity 40 fitting within periphery 52 that receives cover panel 50 from switch assembly 8. It is notable that switch assembly 8 does not make physical contact with any structures within motor enclosure 4 as discussed in U.S. patent application Ser. No. 15/958,217, the disclosure of which was previously incorporated herein by reference. Accordingly, the cavity does not include any additional openings into interior 54 of motor enclosure 4. It is appreciated that raised ridge 44 and pin vent assembly 42 may be located anywhere within cavity 40. Indeed, pin vent assembly 42 may be positioned anywhere on motor enclosure 4, or any other enclosure portion of fluid pump assembly 2, so long as enough material is present between the interior and exterior of enclosure 4, sufficient to create a flame path.

Figure 4:
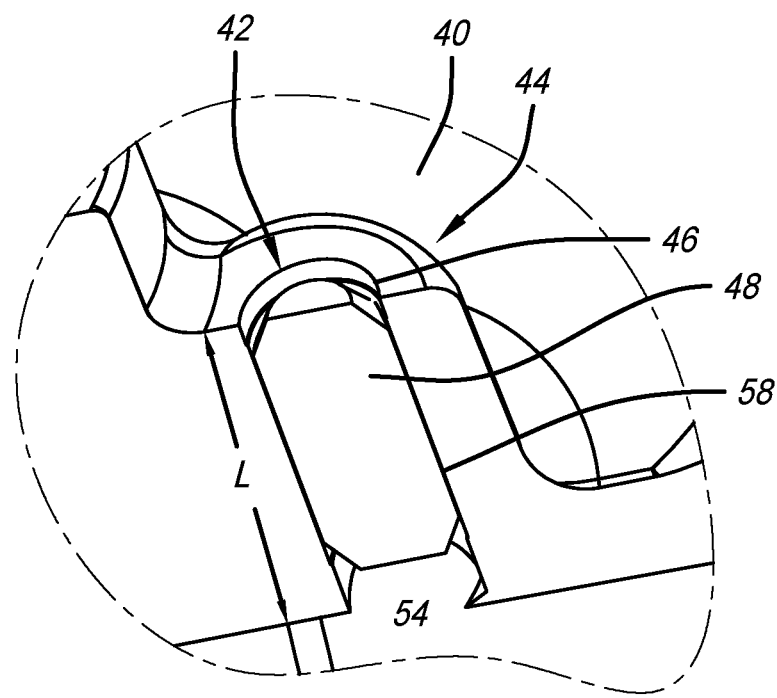
FIG. 4 is a detail cross-sectional view of a raised ridge and pin vent assembly.

A detail cross-sectional view of raised ridge 44 and pin vent assembly 42 in cavity 40 is shown in FIG. 4. This view demonstrates the construction of pin vent assembly 42. Particularly, bore 46 includes a peripheral surface 56 that extends from cavity 40 (i.e., exterior of motor enclosure 4), to interior 54 of motor enclosure 4. Accordingly, bore 46 provides sufficient length L to create a pathway that can serve as a flame path. Pin 48 is then friction fit or slip fit into bore 46, depending on certifying entity requirements. Pin 48 includes a peripheral surface 58 that opposes peripheral surface 56 of bore 46 to form the flame path therebetween. As further shown herein, although bore 46 is cylindrical, peripheral surface 58 of pin 48 is not fully cylindrical. Instead, and as shown, for example, in FIG. 5, cuts or flats are formed in peripheral surface 58 that create the longitudinal extending passageways that can serve as a flame path. In this manner, length, width, and depth dimensions that are needed to calculate certifiable flame paths are measurable by this bore/pin configuration. Having these variables controlled and measurable, allow the certifying agency to make the necessary measurements required to determine a certifiable flame path for an explosion-proof pump. At the same time, these passageways between the exterior and interior of fluid pump assembly 2 allow pressure to equalize, particularly in circumstances where the hot pump is being cooled, by rain, for example, which would otherwise create a pressure differential causing rainwater to draw into the interior of the pump housing.

Figure 5:
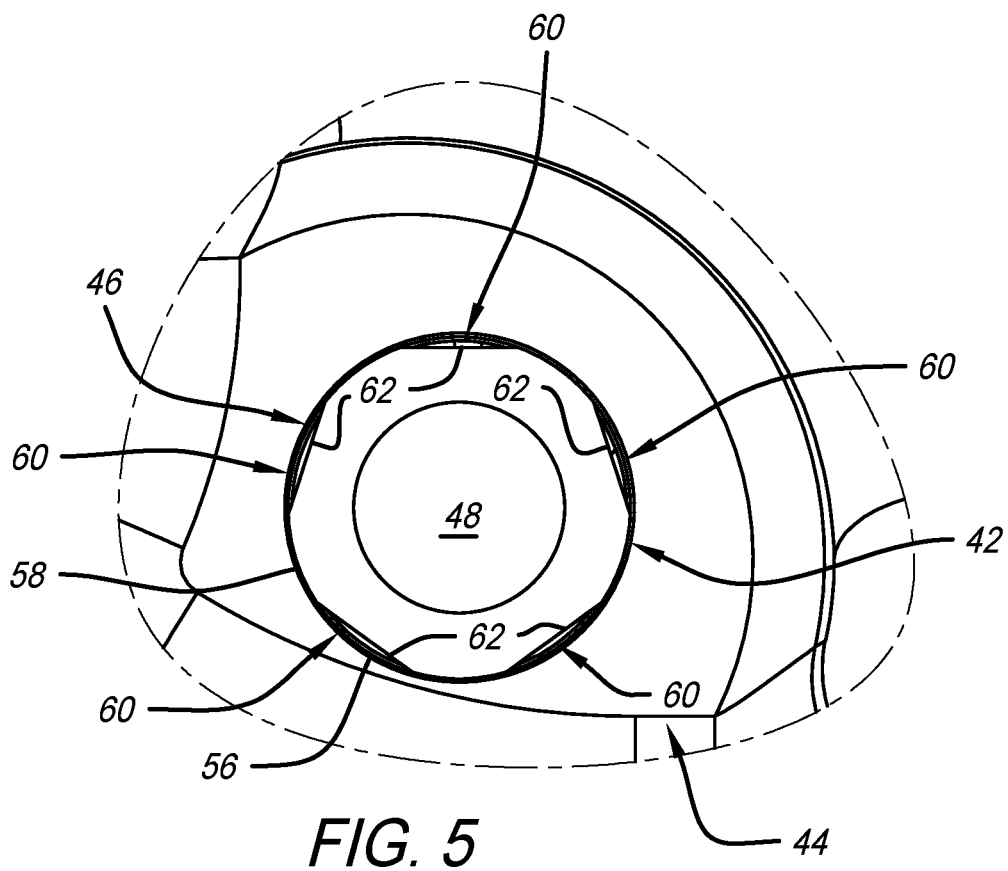
FIG. 5 is a side detail view of the raised ridge located in a cavity.

A side detail view of raised ridge 44 in cavity 40 is shown in FIG. 5. This view further depicts the plurality of flame paths 60 located in pin vent assembly 42. As shown herein, flats 62 are formed on peripheral surface 58 of pin 48. When disposed in bore 46, flats 62, facing peripheral surface 56 of bore 46, create small passageways which are the flame paths 60. By controlling the length and width of each flat 62 of pin 48, and the length and width of peripheral surface 56 of bore 46, the size of these flame paths 60 can be calculated to determine whether they meet needed certification as a flame path. Other types of vents or openings such as membrane or sintered vents may operate sufficiently for purposes of balancing air pressure between the interior and exterior of a pump, but they may not suffice for flame path requirements for some applications. In addition, the illustrated configuration, as well as the other embodiments suggested herein, create the dimensions in a way that can be understood by a certifying body to determine whether the flame paths are sufficient. A struggle with other types of venting mechanisms, even if they could conceivably be used as a flame path, may not contain familiar dimensions and configurations that a certifying body could employ to calculate a certifiable flame path. The certifying entity has general guidelines for maximum gaps and minimum lengths and can be different depending on the entity. Also, the entity may elect to perform controlled explosion testing. In special cases, the agency may allow established limits to be exceeded, but it is believed the entity will require controlled explosion testing on the device.

Figure 6A:
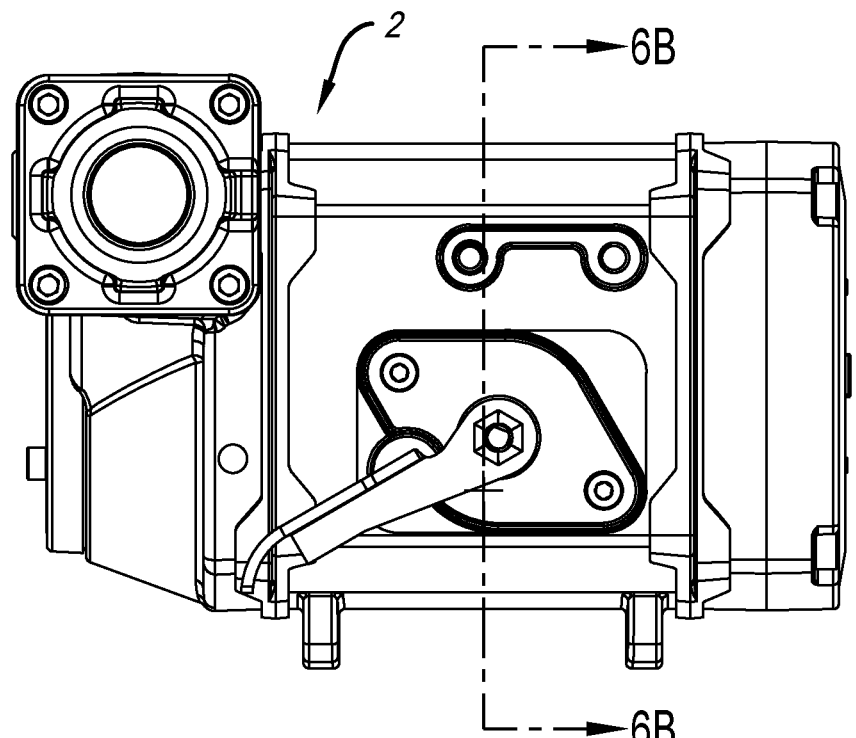
FIGS. 6A and 6B are side and detail cross-sectional views of the pump assembly.
Figure 6B:
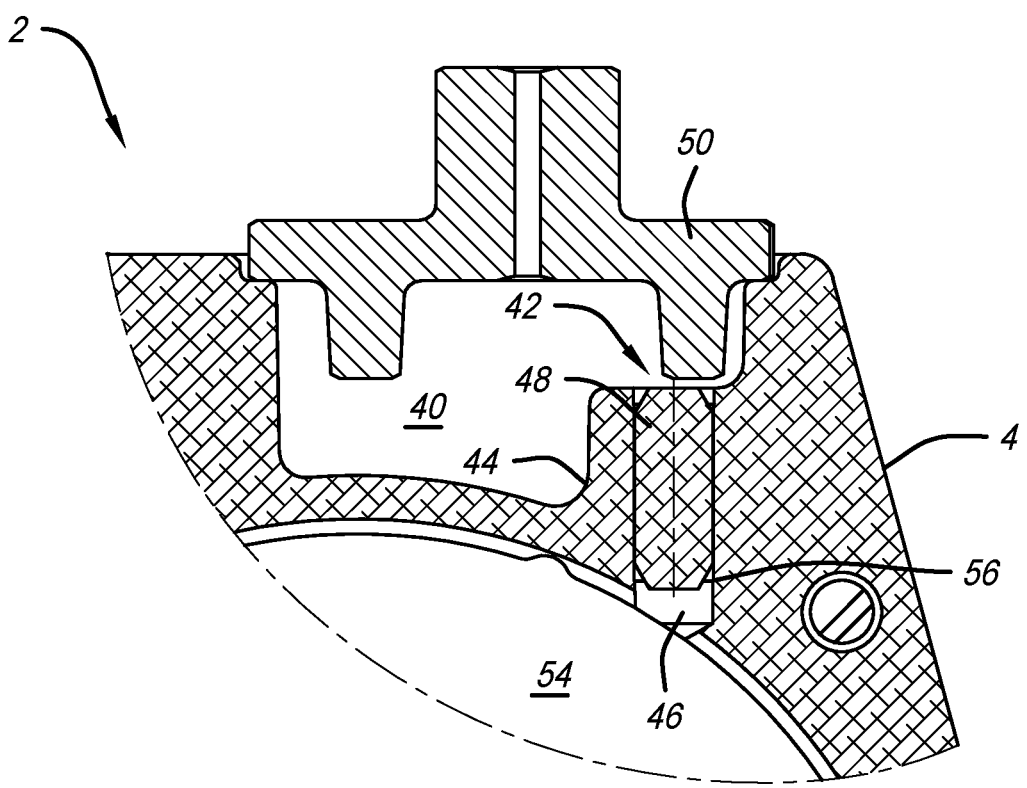

A side view and detail cross-sectional view of fluid pump assembly 2 are shown in FIGS. 6A and 6B, respectively. The view of fluid pump assembly 2 in FIG. 6A is similar to that shown in FIG. 2A. The detail cross-sectional view shown in FIG. 6B further demonstrates how pin vent assembly 42 communicates between the exterior of motor enclosure 4, and interior 54 of same. As shown, bore 46, with peripheral surface 56, extends from exterior of motor enclosure 4 to interior 54. Pin 48 is shown fitted into bore 46 as previously discussed. This view also shows how covered panel 50 fits over cavity 40 to shroud pin vent assembly 42 concealing it underneath, but not sealing it off from the outside environment. The effect of this, again, is that rainwater is generally kept away from bore 46, but air is not. Thus, water that may be present on the exterior side of cover panel 50 should not seep into pin vent assembly 42. At the same time, air exchange is allowed between the interior 54 of motor enclosure 4 and the outside environment to maintain a general equilibrium in pressure between the two spaces. Additionally, the flame path established by use of a pin vent might also be protected using a device such as a membrane vent patch placed over the pin. The vent still allows exchange of air without defeating the function but prevents passage of moisture through the vent. The membrane vent alone is not believed sufficient to meet explosion proof requirements, however.

Figure 7A:
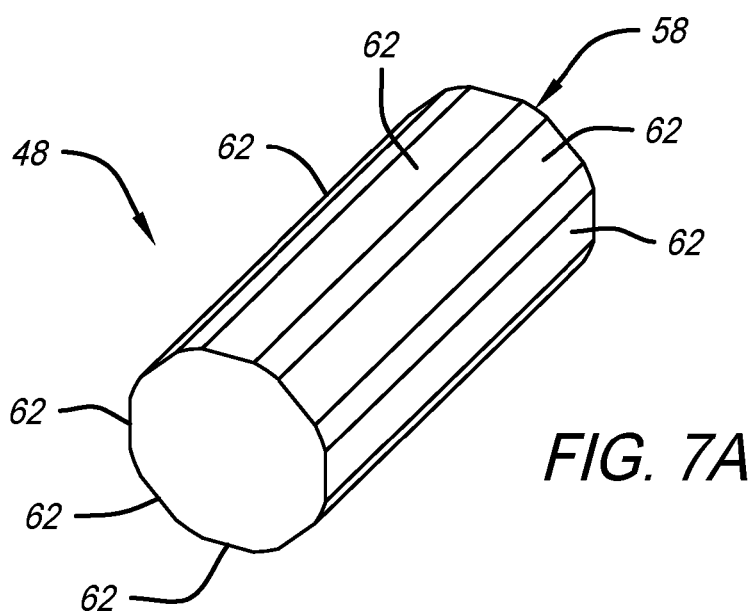
FIGS. 7A, 7B, and 7C are perspective and end views of a vent pin.
Figure 7B:
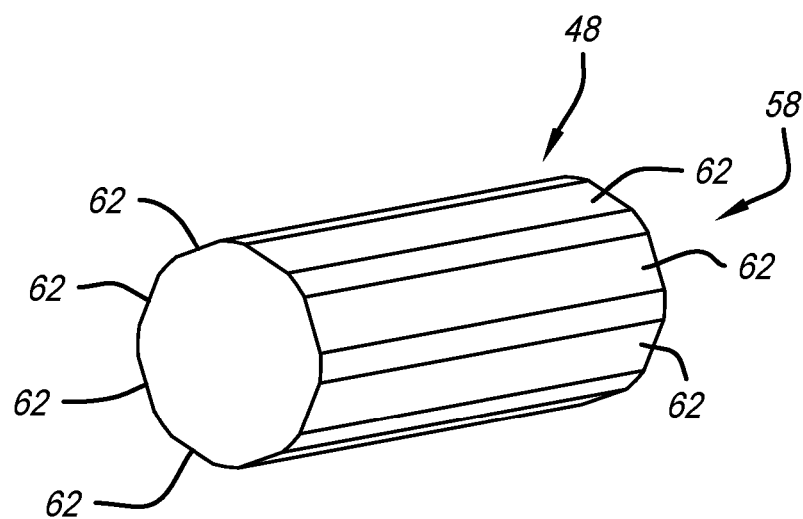
Figure 7C:
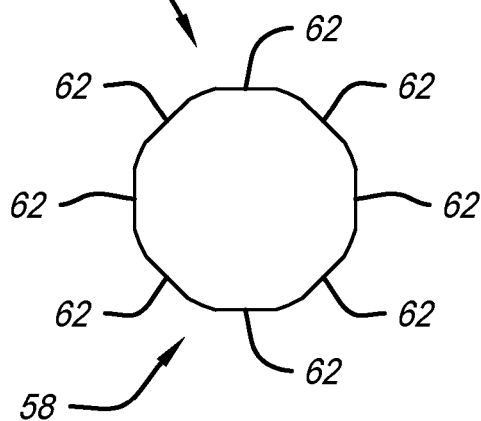

Various perspective views, and an end view of pin 48 are shown in FIGS. 7A, 7B, and 7C, respectively. From these views, it can be appreciated how flats 62 may be formed along the longitudinally extending peripheral surface 58 of pin 48. By modifying the peripheral surface of a round cylinder to include one or more flat surfaces, which is measurable in both length and depth pursuant to established regulatory guidelines, when combined with the cylindrical peripheral surface 56 of bore 46, the cross-sectional gap of the space created can be determined. This, in turn, allows determination of whether that space, or resulting passageway, is sufficient to constitute a certifiable flame path. Depending on the intended use and expected explosive environment, the certifying entity may choose to perform controlled explosion testing or control other characteristics of the pin vent. It is also appreciated that one or more such flat surfaces may be employed on the pin to form the sufficiently sized passageway which creates the flame path.

Figure 8A:
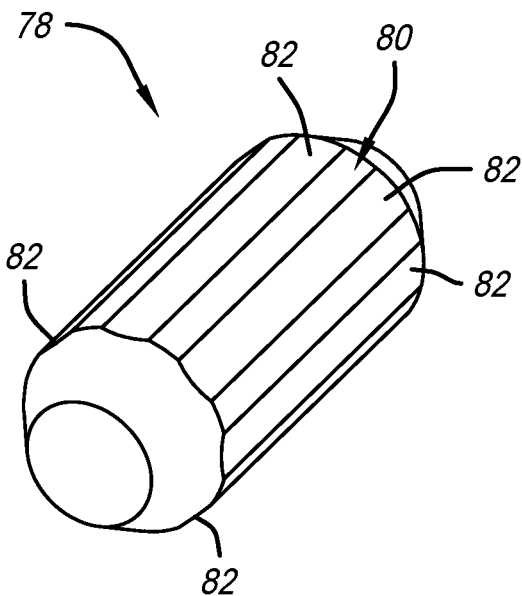
FIGS. 8A, 8B, and 8C are perspective and front views of another illustrative embodiment of a vent pin.
Figure 8B:
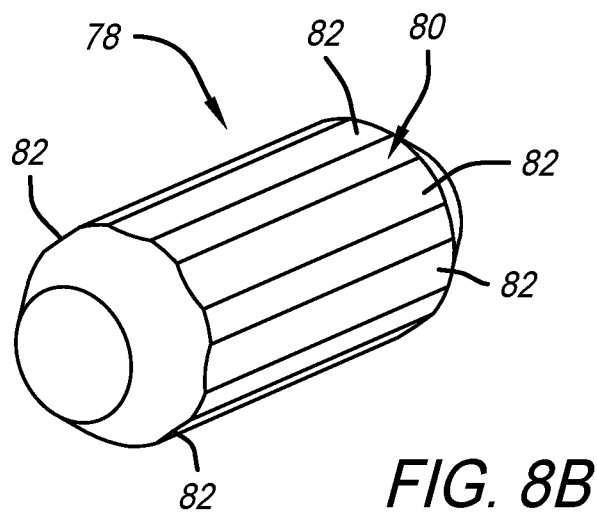
Figure 8C:
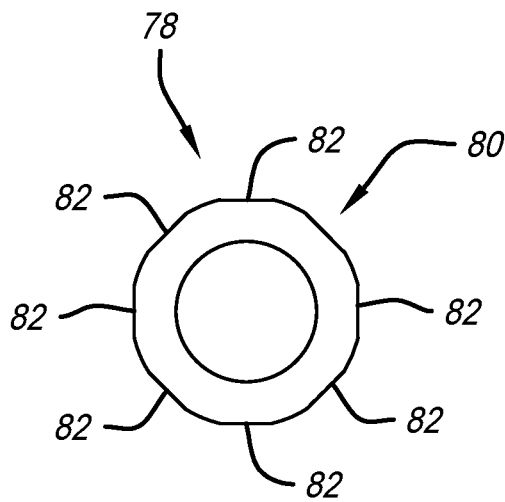

Various perspective views and a front view of another illustrative embodiment of a pin 78 is shown in FIGS. 8A, 8B, and 8C, respectively. This embodiment demonstrates how peripheral surface 80, like peripheral surface 58, can be modified in different manners to create flame paths. Here, scalloped channels are longitudinally formed along the length of peripheral surface 80 of pin 78. Again, it is appreciated that any number of such scallops 82 may be employed to obtain the needed flame path or flame paths when inserted into bore 46, for example.

Figure 9A:
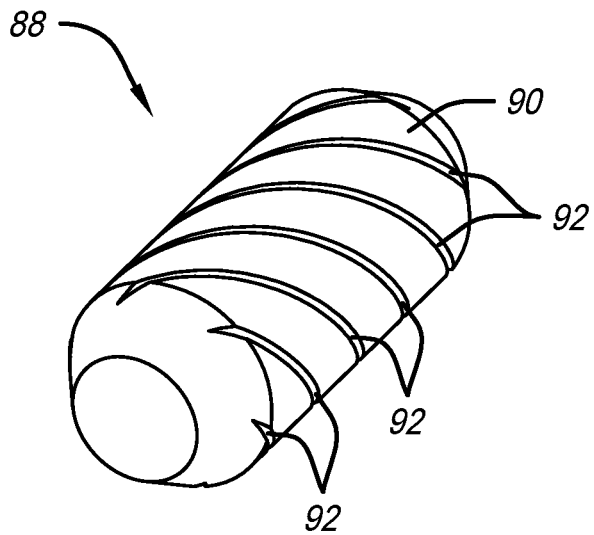
FIGS. 9A, 9B, and 9C are perspective and end views of a vent pin according to another illustrative embodiment of the disclosure.
Figure 9B:
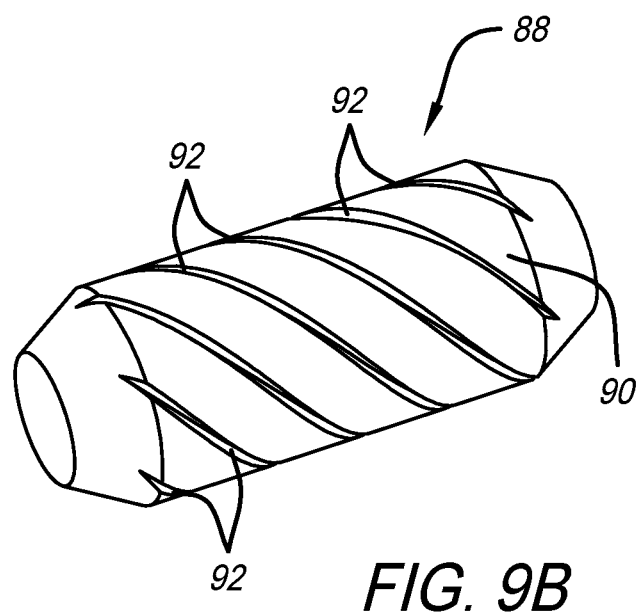
Figure 9C:
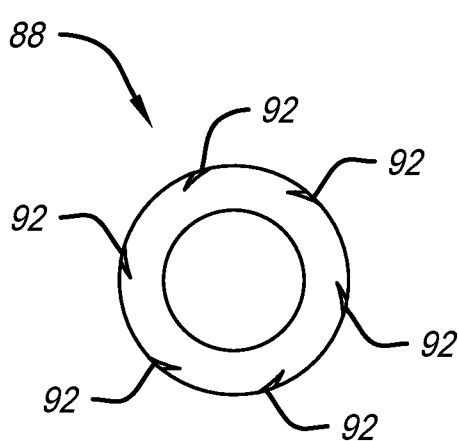

In another illustrative embodiment, the various perspective views and end view of pin 88, depicting another illustrative embodiment of such a pin, is shown in FIGS. 9A, 9B, and 9C, respectively. For this embodiment, spiral channels 92 extend from one end of pin 88 to the other end on surface 90. The spiraled channels, like the scalloped channels and flats previously discussed, extend from one end of the pin to the other, sufficient to provide air passageways from the exterior of the pump housing to the interior of same, in order to help promote pressure equilibrium between the interior and exterior of fluid pump assembly 2.

Figure 10A:
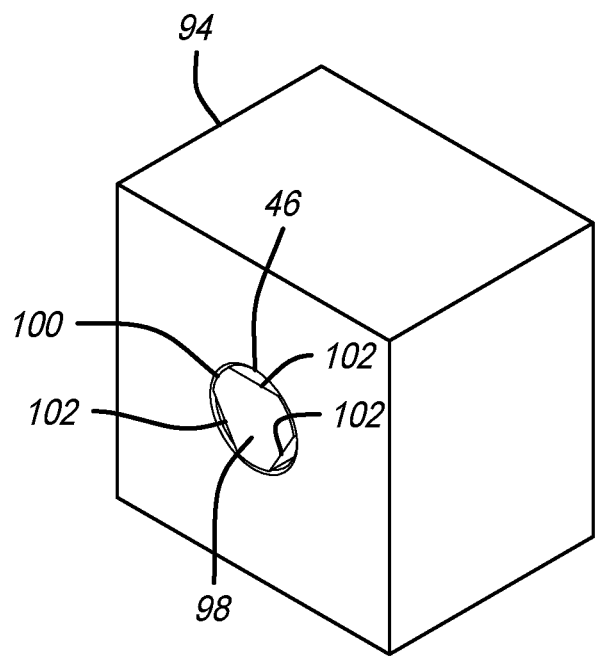
FIGS. 10A, 10B, and 10C are perspective, front, and cross-sectional views of another illustrative embodiment of a vent pin located within a bore of the enclosure.
Figure 10B:
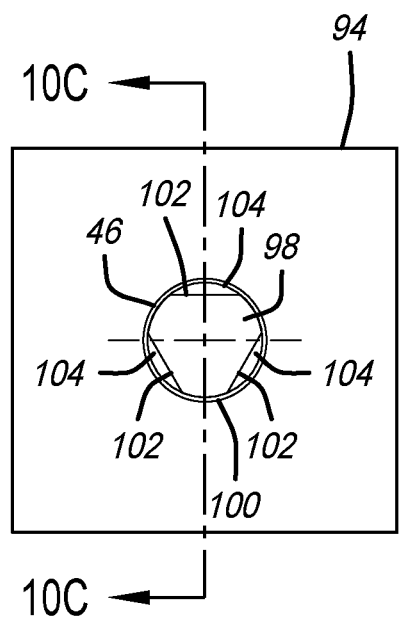
Figure 10C:
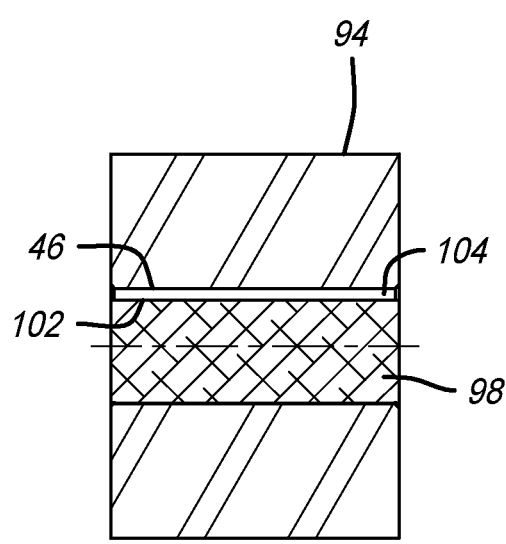

In another illustrative embodiment, the pin extending into the bore does not need to be cylindrical. As shown in FIG. 10A, for example, a non-cylindrical pin 98 is disposed through cylindrical bore 46 that is disposed through a portion of an enclosure housing 94. It is appreciated that enclosure housing 94 (analogous to raised ridge 44 previously discussed) provides a sufficient thickness to create a pathway between the exterior and interior of a pump assembly that meets the application and certifying entity's requirements. In this embodiment, pin 98 includes 3 flats 102 formed on peripheral surface 100. Although not a proper triangle, as shown in FIG. 10B, pin 98 has a triangularly-shaped profile. Shown in FIG. 10B are passageways 104 formed between bore 46 in enclosure housing 94 and flats 102. Again, because of the dimensions purposefully created by flats 102, the dimensions of passageway 104 can be calculated to determine whether it is sufficient to serve as a certifiable flame path. FIG. 10C further illustrates the passageway from the exterior to interior of a pump by virtue of passageway 104 created by the peripheral surface of bore 46 and flat 102. The structures have a longitudinal length which forms the pathway necessary to create a certifiable flame path.

Figure 11A:
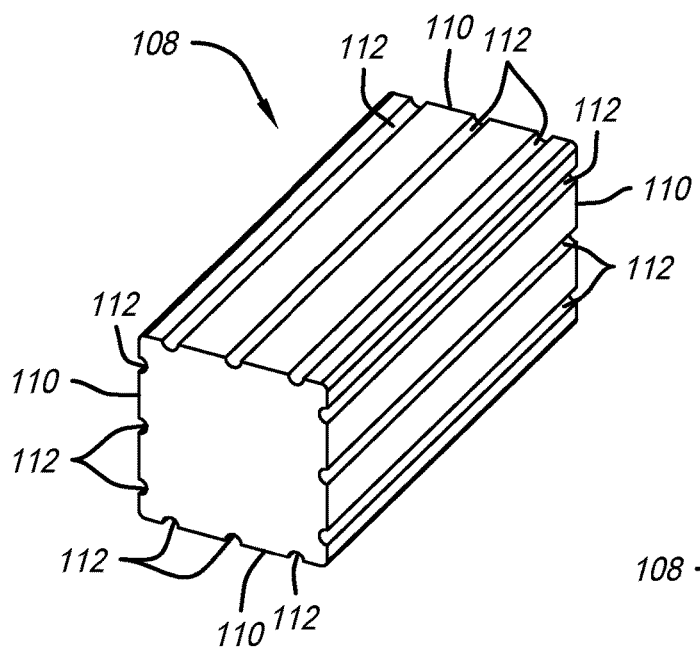
FIGS. 11A, 11B, and 11C are various perspective, and end views of another illustrative embodiment of a vent pin.
Figure 11B:
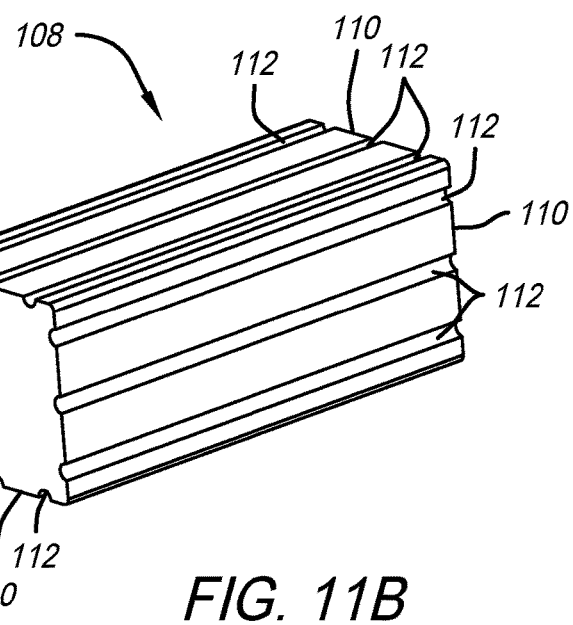
Figure 11C:
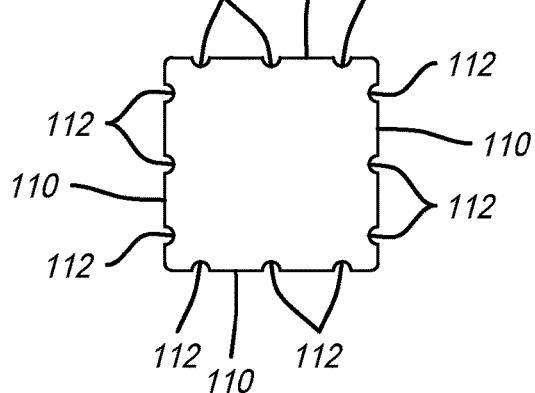

Another illustrative embodiment demonstrates how the pin and the cavity do not need to have a cylindrical cross-section. Various perspective views, and an end view of pin 108, is shown in FIGS. 11A, 11B, and 11C, respectively. For example, this embodiment includes pin 108 having a square-shaped cross-section with orthogonally-oriented linear sides 110. Longitudinally extending channels 112 extend from one end of pin 108 to the other.

Figure 12:
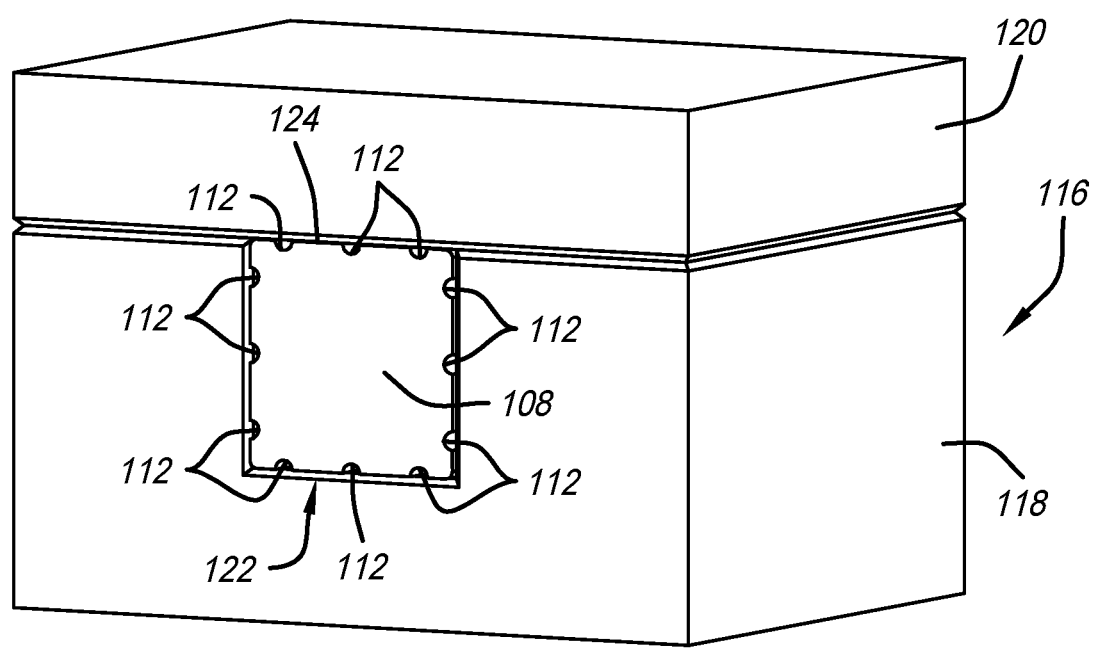
FIG. 12 is a perspective view of another illustrative embodiment of an enclosure housing.

As shown in the perspective view of FIG. 12, an enclosure housing portion 116 may be formed of multiple components 118 and 120 to form, in this example, a square cross-section bore 122. It is appreciated that a lower surface 124, of component 120, may form one of the sides of bore 122. Pin 108, with channels 112 extending thereon, allows air to migrate from the exterior of the pump assembly to the interior to help maintain air pressure equilibrium. In a further illustrative embodiment, a solid portion of a housing may have passages disposed directly therethrough from exterior to interior. So long as the dimensions of the passages or bores are known, they can be evaluated to determine if they are sufficient to create a certifiable flame path.

Figure 13A:
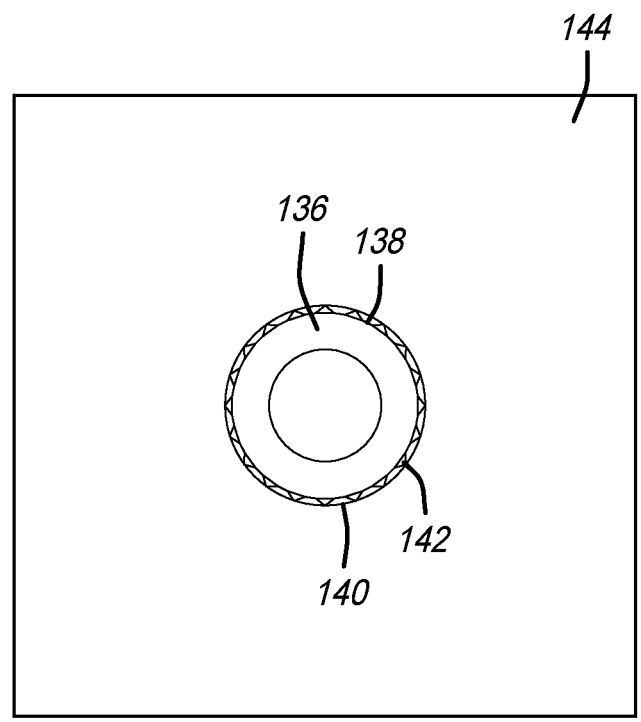
FIGS. 13A and 13B are front and perspective views of another illustrative embodiment of a vent pin located within a bore of an enclosure.
Figure 13B:
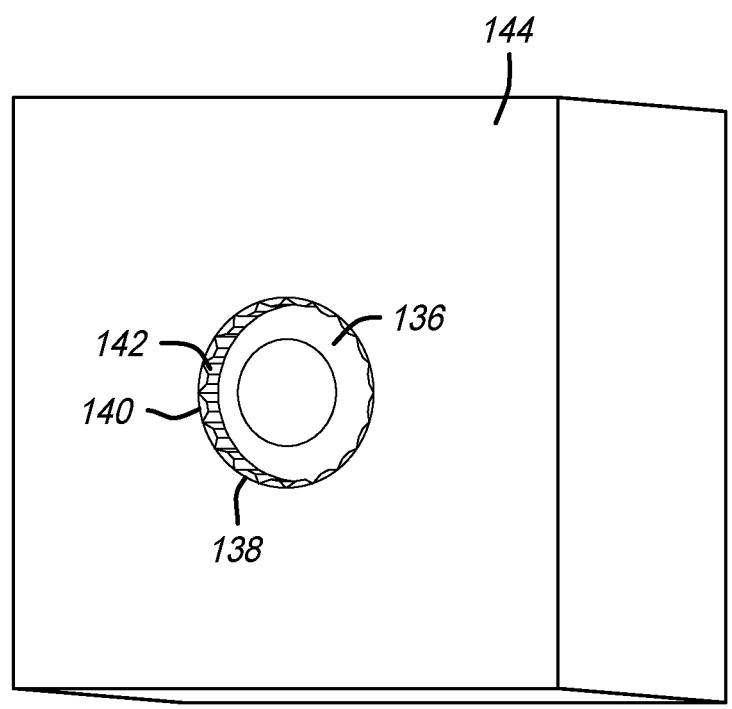

Another illustrative embodiment of the disclosure is shown in FIGS. 13A and 13B. In this embodiment, pin 136 includes a smooth cylindrical surface 138 like peripheral surface 58 of pin 48. As shown in the front view of FIG. 13A, peripheral surface 142 of bore 140 may be scored to produce the passageways through enclosure housing 144. As such, it will be appreciated by the skilled artisan upon reading this disclosure that either the surface of the pin or surface of the bore, or both, may be modified to create the flame paths. The perspective view of FIG. 13B further shows the score relief of surface 142 of bore 140 disposed through enclosure housing 144. This score relief, along with pin 136 form the flame paths employed in this embodiment.

Figure 14A:
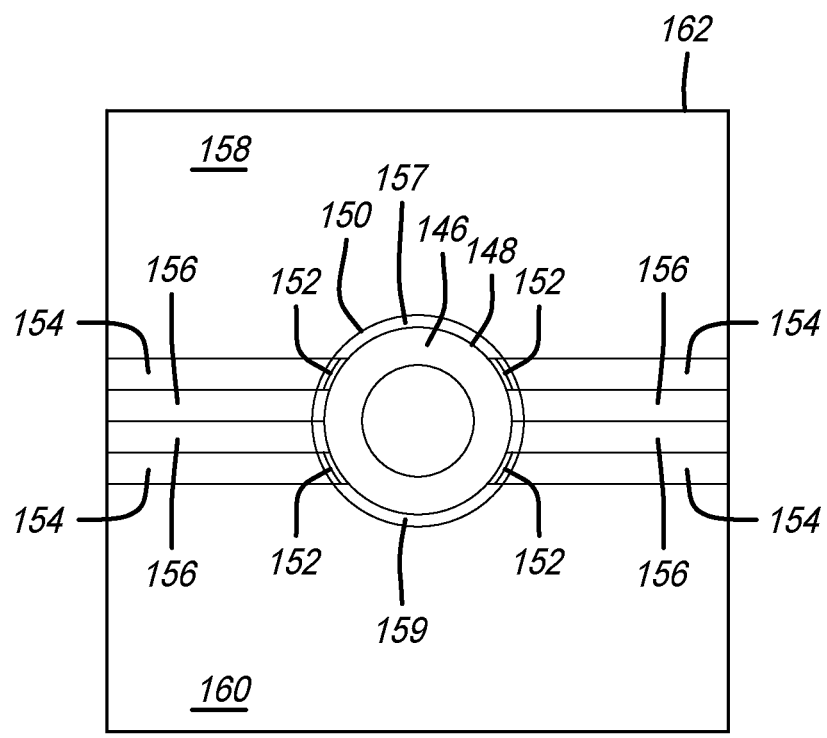
FIGS. 14A and 14B are front and perspective views of another illustrative embodiment of a vent pin located within a bore of an enclosure.
Figure 14B:
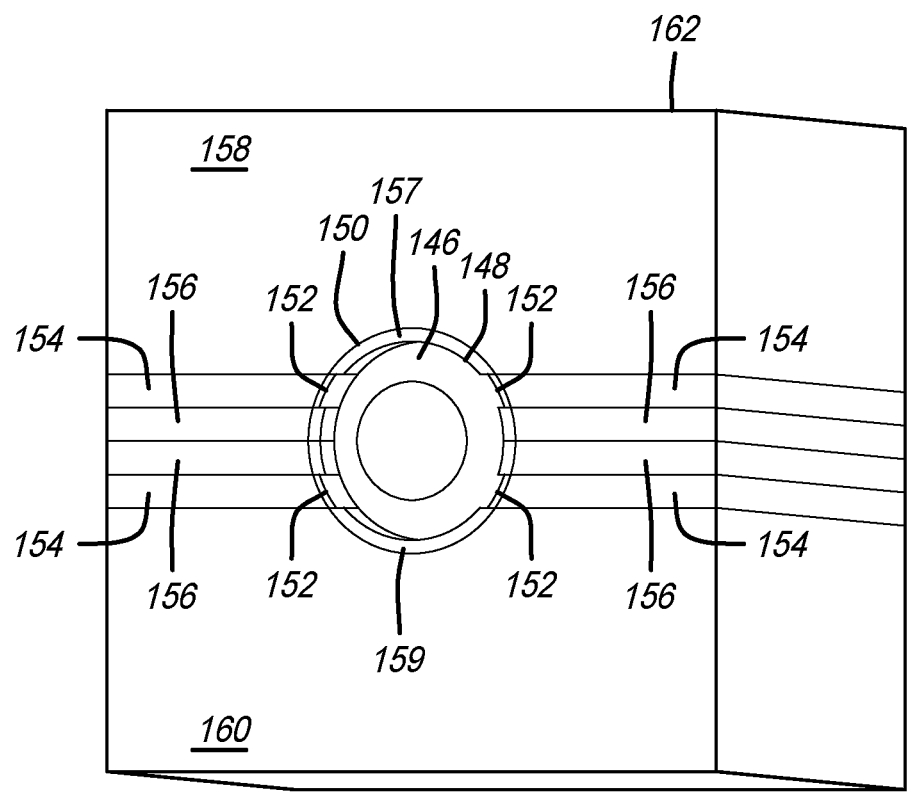

Similarly, in yet another illustrative embodiment, a scored bore may be created by using a lamination of components, as shown in FIGS. 14A and 14B. In this embodiment, pin 146 includes a smooth cylindrical surface 148 also similar to peripheral surface 58 of pin 48. As shown in the front view of FIG. 14A, vents 152 of bore 150 may be produced via laminations 154 and 156. Further, section 158 and 160 of enclosure housing 162 may illustratively include portions of laminations 157 and 159, respectively, with respect to bore 150 as well. The perspective view of FIG. 14B depicts vent 152 on bore 150 disposed through enclosure housing 162 to create the flame paths employed in this embodiment.

Figure 15:
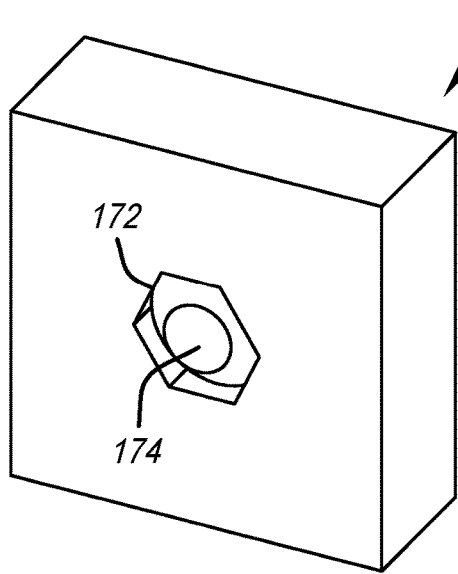
FIG. 15 is a perspective view of another illustrative embodiment of a vent pin located within a bore of an enclosure.

Another illustrative embodiment of the present disclosure provides a pin vent assembly usable in a non-explosive environment where the flame-path component is not needed. Non-limiting examples of such devices that have non-explosive environments that may incorporate the disclosures herein include fluid pumps, flow meters, flow computer, and flow transmitter. In an illustrative embodiment, as shown in the perspective view of pump enclosure wall 170 of FIG. 15, a bore 172 is disposed therethrough and a pin 174 is fitted into bore 172. The pump associated with enclosure wall 170 shown in FIG. 15 may be a pump assembly that has a motor and/or electronics package that generates heat while at the same time exposed to moisture-prone environments that may create a pressure gradient between the interior and exterior of the enclosure. Since a flame path is not needed, pin 174 may extend either completely or partially the length of bore 172.

Figure 16:
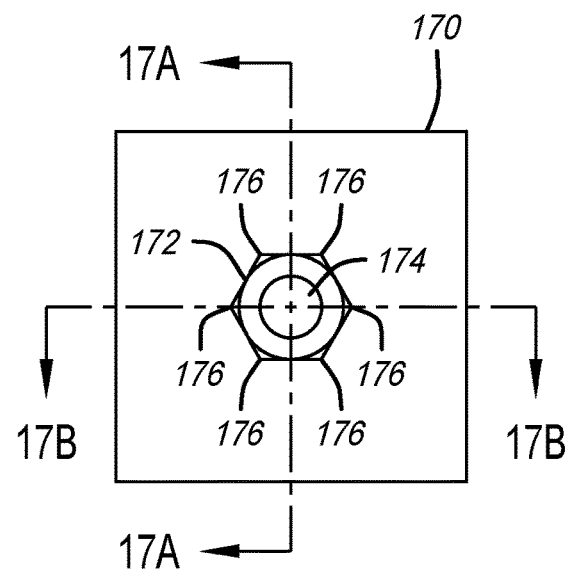
FIG. 16 is a front view of a portion of the enclosure wall with a vent pin disposed in a bore.

The facing view of enclosure wall 170 is shown in FIG. 16. This view demonstrates how air may pass between the pin and bore sidewalls to alleviate any pressure gradient between the interior and exterior of the pump enclosure. Illustratively, bore 172 is hexagonally shaped whereas pin 174 is cylindrically shaped. These different cross-sectional profiles create small passageways 176 between pin 174 and enclosure wall 170 that allow air to communicate between interior and exterior of pump enclosure wall 170. It is appreciated that passageways 176 are sized such that air may pass through, but small enough that penetration by rainwater is less likely. That said, because air is able to pass between each side of pump enclosure wall 170, such moisture caused by precipitation is less likely to be drawn into the enclosure at this location, or other locations such as seams, joints, or other mating structures that may exist as part of the pump enclosure.

Figure 17A:
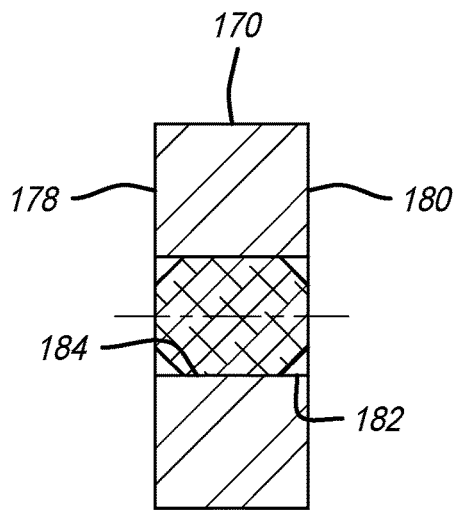
FIGS. 17A and 17B are cross-sectional views of the enclosure wall with a vent pin disposed in a bore.
Figure 17B:
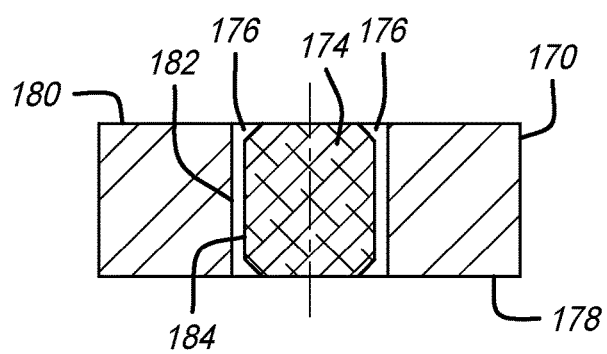

Cross-sectional views of enclosure wall 170 taken along lines A-A and B-B of FIG. 16 are shown in FIGS. 17A and 17B, respectively. The view shown in FIG. 17A depicts exterior side surface 178 and interior side surface 180 of pump enclosure wall 170. Exterior side surface 178 is the side that will be exposed to the outside environment and possibly precipitation whereas interior side surface 180 is located adjacent a motor, electronics, controller, or other heat generating areas inside the pump enclosure. This view also shows interior wall 182 of bore 172 and sidewall 184 of pin 174. In this view, section A-A taken along the corresponding lines of FIG. 16 depicts walls 182 and 184 abutting each other. At this location, pin 174 is friction fitted into bore 172. This helps keep pin 174 position within bore 172. It is appreciated that other modes of attachment including adhesive, mechanical fastener, or even integrally forming the passageways in the enclosure wall may be employed.

The view shown in FIG. 17B depicts passageways 176 formed from interior wall 182 of bore 172 and sidewall 184 of pin 174. As shown, passageways 176 extend from exterior side surface 178 to interior side surface 180. Thus, air may travel through passageways 176 between exterior and interior side surfaces 178 and 180, respectively, to assist in preventing a substantial pressure gradient between the interior and exterior of the pump enclosure. In this way, balancing the pressure makes it less likely that precipitation will be drawn into the motor enclosure and damage any electronic structures therein that might be sensitive to moisture.

Electronic devices that may be housed in an enclosure may include, but is not limited to, at least one of A motor, circuit board, processor, transformer, integrated circuit, communication device, thermal interface, sensor, rectifier, inductor, capacitor, electro-mechanical switches, wiring, connectors, current and temperature limiting devices, pressure sensors, piezo transducers, antennas, EMI filters, and the like.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed is:

1. An explosion-proof fluid transfer pump assembly comprising:
   a motor enclosure located adjacent a pump enclosure;
   wherein the motor enclosure includes a wall separating an interior that receives a motor configured to drive a pump located in the pump enclosure from an exterior of the explosion-proof fluid transfer pump assembly;
   wherein the motor enclosure includes a bore extending through the wall of the motor enclosure from the interior of the motor enclosure to the exterior of the explosion-proof fluid transfer pump assembly;
   wherein the bore is formed by at least one peripheral surface extending from the interior of the motor enclosure to the exterior of the explosion-proof fluid transfer pump assembly;
   a vent pin that extends through the bore;
   wherein the vent pin fills space within the bore and engages the at least one peripheral surface except that at least one portion of a pin surface of the vent pin is spaced apart from at least one portion of the at least one peripheral surface of the bore to form at least one flame path between the at least one portion of the pin surface of the vent pin and the at least one portion of the at least one peripheral surface of the bore from the interior of the motor enclosure to the exterior of the explosion-proof fluid transfer pump assembly to equalize pressure between the interior of the motor enclosure to the exterior of the explosion-proof fluid transfer pump assembly.

2. The explosion-proof fluid transfer pump assembly of claim 1, wherein the vent pin is friction fit or slip fit with the bore.

3. The explosion-proof fluid transfer pump assembly of claim 1, wherein the at least one peripheral surface of the bore has a circular cross-section and wherein the at least one portion of the pin surface is planar to form the at least one flame path between the at least one portion of the pin surface of the vent pin and the at least one portion of the at least one peripheral surface of the bore.

4. The explosion-proof fluid transfer pump assembly of claim 3, wherein the at least one portion of the pin surface is a plurality of portions of the pin surface, wherein each of the plurality of portions of the pin surface is planar to form a flame path.

5. The explosion-proof fluid transfer pump assembly of claim 1, wherein the at least one portion of the pin surface is a scalloped channel to form the at least one flame path between the at least one portion of the pin surface of the vent pin and the at least one portion of the at least one peripheral surface of the bore.

6. The explosion-proof fluid transfer pump assembly of claim 5, wherein the at least one portion of the pin surface is a plurality of portions of the pin surface, wherein each of the plurality of portions of the pin surface is a scalloped channel to form a flame path.

7. The explosion-proof fluid transfer pump assembly of claim 1, wherein the vent pin has a circular cross-section, wherein the at least one portion of the pin surface is at least one spiraled channel that extends from a first end of the vent pin to a second end of the vent pin to form the flame path.

8. The explosion-proof fluid transfer pump assembly of claim 7, wherein the at least one spiraled channel is a plurality of spiraled channels that extend from the first end of the vent pin to the second end of the vent pin, wherein each of the plurality of spiraled channels forms a flame path.

9. The explosion-proof fluid transfer pump assembly of claim 1, wherein the at least one peripheral surface of the bore has a circular cross-section and the vent pin has a non-circular cross-section.

10. The explosion-proof fluid transfer pump assembly of claim 9, wherein the non-circular cross-section of the vent pin is triangularly-shaped.

11. The explosion-proof fluid transfer pump assembly of claim 1, wherein the at least one peripheral surface of the bore has a polygonal cross-section and the vent pin has a corresponding polygonal cross-section, wherein the at least one portion of the vent pin surface is spaced apart from the peripheral surface of the bore to form the flame path.

12. The explosion-proof fluid transfer pump assembly of claim 11, wherein the at least one portion of the pin surface of the vent pin is a plurality of portions of the pin surface of the vent pin, wherein each of the plurality of portions of the pin surface of the vent pin are spaced apart from the peripheral surface of the bore to form a flame path.

13. The explosion-proof fluid transfer pump assembly of claim 1, wherein the motor enclosure is composed of at least first and second components wherein the at least one peripheral surface of the bore is composed of at least both the first component of the motor enclosure and the second component of the motor enclosure.

14. The explosion-proof fluid transfer pump assembly of claim 1, wherein the at least one peripheral surface of the bore is scored to form the flame path between the at least one portion of the pin surface of the vent pin and the at least one portion of the at least one peripheral surface of the bore.

15. The explosion-proof fluid transfer pump assembly of claim 1, wherein the at least one portion of the pin surface of the vent pin is scored to form the flame path between the at least one portion of the pin surface of the vent pin and the at least one portion of the at least one peripheral surface of the bore.

16. An explosion-proof fluid transfer pump assembly comprising:

an electronic device enclosure;

wherein the electronic device enclosure includes a wall separating an interior of the electronic device enclosure from an exterior of the explosion-proof fluid transfer pump assembly;

wherein the electronic device enclosure includes a bore extending through the wall of the electronic device enclosure from the interior of the electronic device enclosure to the exterior of the explosion-proof fluid transfer pump assembly;

wherein the bore is formed by at least one peripheral surface extending from the interior of the electronic device enclosure to the exterior of the explosion-proof fluid transfer pump assembly;

a vent pin that extends through the bore;

wherein the vent pin fills space within the bore and engages the at least one peripheral surface except that at least one portion of a pin surface of the vent pin is spaced apart from at least one portion of the at least one peripheral surface of the bore to form at least one flame path between the at least one portion of the pin surface of the vent pin and the at least one portion of the at least one peripheral surface of the bore from the interior of the electronic device enclosure to the exterior of the explosion-proof fluid transfer pump assembly to equalize pressure between the interior of the electronic device enclosure to the exterior of the explosion-proof fluid transfer pump assembly.

17. The explosion-proof fluid transfer pump assembly of claim 16, wherein the electronic device is selected from the group consisting of at least one of a motor, circuit board, processor, transformer, integrated circuit, communication device, thermal interface, sensor, rectifier, inductor, capacitor, electro-mechanical switch, wiring, connector, current limiting device, temperature limiting device, pressure sensor, piezo transducer, antenna, and EMI filter.

18. The explosion-proof fluid transfer pump assembly of claim 15, wherein the at least one peripheral surface of the bore has a cross-section selected from the group consisting of circular and polygonal, and wherein the at least one portion of the pin surface vent pin is selected from the group consisting of at least one of a planar, scalloped, spiraled channel, scored, circularly cross-sectioned, non-circularly cross-sectioned, and triangularly-shape cross-sectioned, that extends from a first end of the vent pin to a second end of the vent pin to form the at least one flame path between the at least one portion of the pin surface of the vent pin and the at least one portion of the at least one peripheral surface of the bore.

19. The explosion-proof fluid transfer pump assembly of claim 16, wherein the electronic device is selected from the group consisting of a flow meter, flow computer, and flow transmitter.

20. The explosion-proof fluid transfer pump assembly of claim 16, wherein the vent pin is friction fit or slip fit with the bore.

* * * * *